United States Patent
Akman

(10) Patent No.: US 11,590,978 B1
(45) Date of Patent: Feb. 28, 2023

(54) ASSESSING PERCEPTION OF SENSOR USING KNOWN MAPPED OBJECTS

(71) Applicant: Waymo LLC, Mountain View, CA (US)

(72) Inventor: Mehmet Akman, Santa Cruz, CA (US)

(73) Assignee: Waymo LLC, Mountain View, CA (US)

( * ) Notice: Subject to any disclaimer, the term of this patent is extended or adjusted under 35 U.S.C. 154(b) by 262 days.

(21) Appl. No.: 16/807,483

(22) Filed: Mar. 3, 2020

(51) Int. Cl.
- *B60W 30/18* (2012.01)
- *B60R 11/04* (2006.01)
- *G05D 1/02* (2020.01)
- *G06V 20/58* (2022.01)

(52) U.S. Cl.
CPC ....... *B60W 30/18154* (2013.01); *B60R 11/04* (2013.01); *G05D 1/0223* (2013.01); *G06V 20/582* (2022.01); *G06V 20/584* (2022.01); *B60R 2300/80* (2013.01); *B60W 2554/20* (2020.02); *B60W 2554/802* (2020.02); *B60W 2556/45* (2020.02)

(58) Field of Classification Search
CPC ....... B60W 30/18154; B60W 2554/20; B60W 2554/802; B60W 2556/45; B60R 11/04; B60R 2300/80; G05D 1/0223; G06V 20/582; G06V 20/584
See application file for complete search history.

(56) References Cited

U.S. PATENT DOCUMENTS

| | | | |
|---|---|---|---|
| 9,274,525 B1 * | 3/2016 | Ferguson | G01S 7/4004 |
| 9,720,415 B2 | 8/2017 | Levinson et al. | |
| 2018/0188037 A1 * | 7/2018 | Wheeler | B60W 40/02 |
| 2018/0239361 A1 | 8/2018 | Micks et al. | |
| 2019/0278290 A1 * | 9/2019 | Zhang | G01S 13/931 |
| 2020/0081448 A1 * | 3/2020 | Creusot | G06V 20/584 |
| 2020/0377078 A1 * | 12/2020 | Liu | B60W 30/12 |
| 2021/0110715 A1 * | 4/2021 | Sherony | G06T 7/246 |
| 2021/0201070 A1 * | 7/2021 | Omari | G06N 20/00 |

FOREIGN PATENT DOCUMENTS

| | | | | |
|---|---|---|---|---|
| GB | 2578916 A | * | 6/2020 | ........ B60W 60/0011 |
| WO | 2017079349 A1 | | 5/2017 | |

* cited by examiner

*Primary Examiner* — Kenneth J Malkowski
(74) *Attorney, Agent, or Firm* — Botos Churchill IP Law

(57) ABSTRACT

Aspects of the disclosure relate to determining perceptive range of a vehicle in real time. For instance, a static object defined in pre-stored map information may be identified. Sensor data generated by a sensor of the vehicle may be received. The sensor data may be processed to determine when the static object is first detected in an environment of the vehicle. A distance between the object and a location of the vehicle when the static object was first detected may be determined. This distance may correspond to a perceptive range of the vehicle with respect to the sensor. The vehicle may be controlled in an autonomous driving mode based on the distance.

20 Claims, 8 Drawing Sheets

500

ASSESSING PERCEPTION OF SENSOR USING KNOWN MAPPED OBJECTS

BACKGROUND

Autonomous vehicles, such as vehicles which do not require a human driver when operating in an autonomous driving mode, may be used to aid in the transport of passengers or items from one location to another. An important component of an autonomous vehicle is the perception system, which allows the autonomous vehicle to perceive and interpret its surroundings using various sensors such as cameras, radar, lasers, and other similar devices. For example, autonomous vehicles may use the sensors to gather and interpret images and sensor data about its surrounding environment, e.g., parked cars, trees, buildings, etc. Information from the perception system may be used by these vehicles to react to their surroundings by making numerous decisions while the autonomous vehicle is in motion, such as speeding up, slowing down, stopping, turning, etc.

As such, it is important for the vehicle's computing systems to be able to approximate the perceptive range of the vehicle's sensors. This can be especially important to safely determining how far into the future or how far ahead of the vehicle for which the vehicle's computing devices can determine trajectories. Typically, perceptive range is determined or predicted in advance through testing for both optimal and suboptimal conditions, but when occurring in real time, situations such as weather (e.g. rain, fog, snow, dust, etc.) can affect the perceptive ranges in unexpected or undesirable ways. As a result, a vehicle may encounter situations in which the vehicle's computing devices expect that the perception system can perceive objects at distances at which the perception system actually cannot. In other words, when there are no objects close to the vehicle, the computing devices may assume that there are no occlusions and that everything within the predetermined perceptive range is visible.

BRIEF SUMMARY

One aspect of the disclosure provides a method for determining perceptive range of a vehicle in real time. The method includes identifying, by one or more processors, a static object defined in pre-stored map information; receiving, by the one or more processors, sensor data generated by a sensor of the vehicle; processing, by the one or more processors, the sensor data to determine when the static object is first detected in an environment of the vehicle; determining, by the one or more processors, a distance between the static object and a location of the vehicle when the static object was first detected, wherein the determined distance corresponds to a perceptive range of the vehicle with respect to the sensor; and controlling, by the one or more processors, the vehicle in an autonomous driving mode based on the determined distance.

In one example, the sensor is a camera, and the sensor data includes a camera image. In this example, the sensor is a forward-facing camera. In another example, the static object is a traffic signal. In this example, when the static object is first detected includes when the state of the traffic signal was first determined. In another example, the static object is a stop sign. In another example, determining the distance is based on a location of the static object defined in the pre-stored map information. In another example, determining the distance is based on a location of the static object determined from the sensor data. In another example, determining the distance is based on a location of the static object determined from second sensor data generated by a second sensor. In another example, controlling the vehicle includes using the determined distance as a bound upon a planning system of the vehicle, wherein the planning system is configured to generate trajectories for the vehicle to follow. In this example, the bound relates to a maximum planning distance for a trajectory of the vehicle. In another example, the bound relates to a maximum planning time for a trajectory of the vehicle. In another example, controlling the vehicle includes using the determined distance to determine a maximum speed value for the vehicle. In another example, controlling the vehicle includes avoiding one or more predetermined types of driving situations. In this example, the one or more predetermined types of driving situations includes highway driving.

Another aspect of the disclosure provides a system for determining perceptive range of a vehicle in real time. The system includes one or more processors configured to identify a static object defined in pre-stored map information; receive sensor data generated by a sensor of the vehicle; process the sensor data to determine when the static object is first detected in an environment of the vehicle; determine a distance between the static object and a location of the vehicle when the static object was first detected, wherein the determined distance corresponds to a perceptive range of the vehicle with respect to the sensor; and control the vehicle in an autonomous driving mode based on the determined distance.

In this example, the sensor is a camera, and the sensor data includes a camera image. In another example, the static object is a traffic signal. In another example, the static object is a stop sign. In another example, the system also includes the vehicle.

DETAILED DESCRIPTION

Overview

Figure 1:
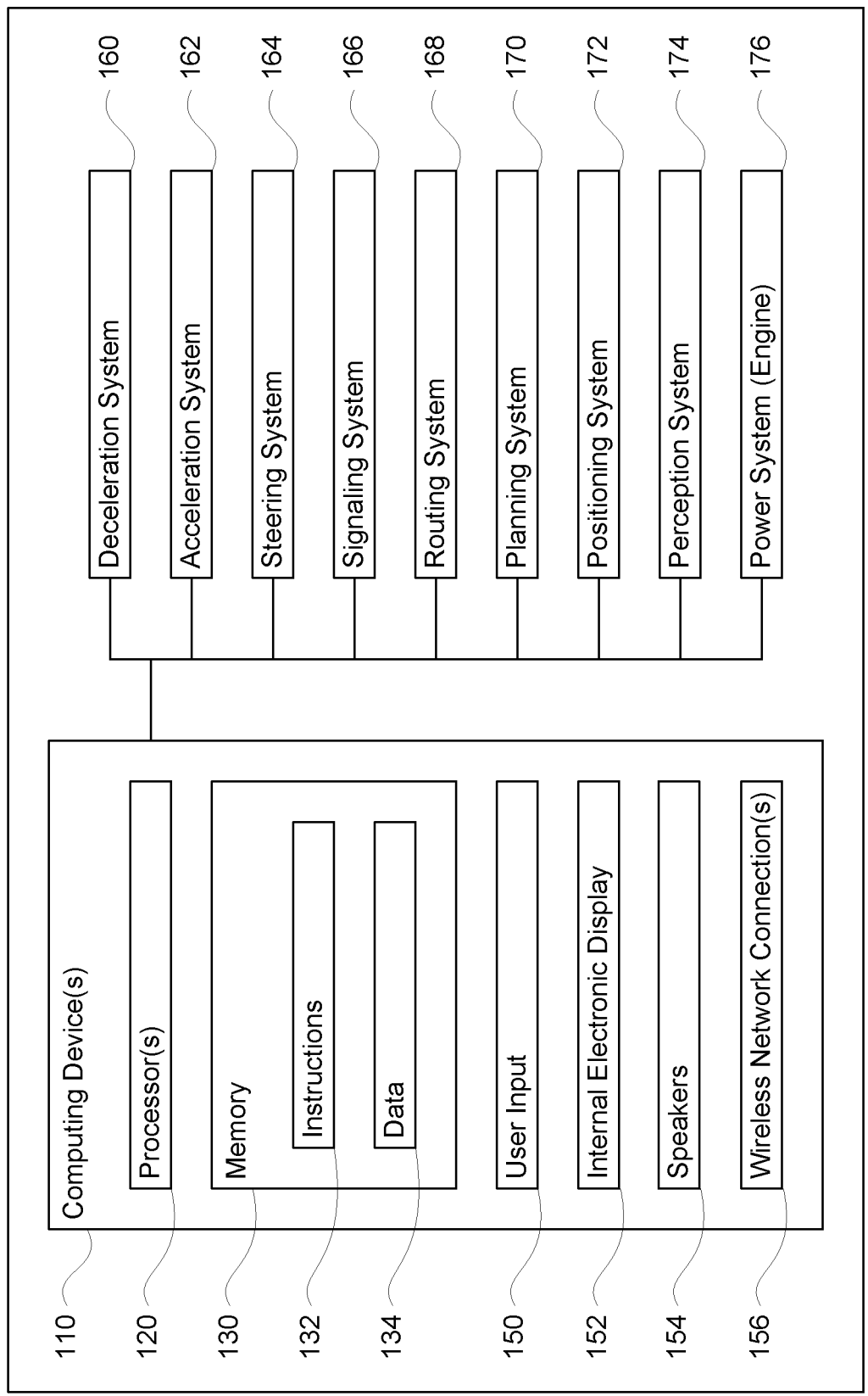
FIG. 1 is a functional diagram of an example vehicle in accordance with an exemplary embodiment.

The technology relates to assessing the perceptive range of sensors of a vehicle having an autonomous driving mode. As noted above, while driving, it is important for the vehicle's computing systems to be able to approximate the perceptive range of the vehicle's sensors. This can be especially important to safely determining how far into the future or how far ahead of the vehicle for which the vehicle's computing devices can determine trajectories. Typically, perceptive range is determined or predicted in advance through testing for both optimal and suboptimal conditions, but when occurring in real time, situations such as weather (e.g. rain, fog, snow, dust, etc.) can affect the perceptive ranges in unexpected ways.

As a result, a vehicle may encounter situations in which the vehicle's computing devices expect that the perception system can perceive objects at distances at which the perception system actually cannot. In other words, when there are no objects close to the vehicle, the computing devices may assume that there are no occlusions and that everything within the predetermined perceptive range is visible.

To determine the perceptive range, a camera may be used to capture images of objects at farther distances than other sensors. In some instances, these objects may be known, static objects such as traffic lights, stop signs, etc. that are precisely mapped. The known locations for these objects can be considered ground truth for determining how far out a vehicle's perception system can detect and classify a given object.

As the vehicle approaches the locations of these objects, the vehicle's computing devices may process sensor data from the perception system, such as camera images, in order to identify or classify these objects. This processing may occur automatically as the vehicle maneuvers through the world in order to enable the vehicle's computing devices to make driving decisions as well as to assist in localization or other processing tasks.

In this regard, since the vehicle's computing devices are already attempting to identify certain objects such as traffic lights and stop signs, the distance at which these objects are identified may be determined to be the perceptive range of the vehicle's perception system at that moment in time. In other words, the perceptive range of a camera may be checked by determining how far from a mapped object that the object can be identified.

The features described herein may enable the real-time determination of a perceptive range of a vehicle's perception system using very little additional resources by leveraging processing that already occurs on the vehicle. As such, every time the vehicle approaches certain static, mapped objects such as traffic lights and stop signs, the perceptive range can be determined rather than simply periodically.

In addition, the determination of perceptive range can also be used as a proxy for estimating weather conditions which affect the vehicle's perception system without requiring complicated weather detection models which require significant amounts of memory and processing power. In other words, rather than estimating weather conditions and guessing at how those conditions are affecting the perceptive range of the vehicle, the features described herein may enable the vehicle's computing devices to directly determine that perceptive range. In this regard, the vehicle's computing devices are able to much more easily recognize a change in perceptive range of the vehicle's sensors even earlier than if estimating weather and may even enable the vehicle's computing devices to perceive weather conditions before the vehicle actually enters such conditions (e.g. before the vehicle drives into rain or fog). In addition, the features described herein may allow an autonomous vehicle's computing devices to estimate the weather conditions at a much smaller region, for example, on a block by block basis. Such information can then be shared across a fleet of vehicles in order to avoid those areas experiencing certain weather conditions (e.g. low visibility in a particular area, snow, fog, etc.) and/or change driving styles of those vehicles accordingly.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing devices 110 containing one or more processors 120, memory 130 and other components typically present in general purpose computing devices.

The memory 130 stores information accessible by the one or more processors 120, including instructions 134 and data 132 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "software," "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processors 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing devices 110. Accordingly, references to a processor or computing device will be understood to include references to a collection of processors or computing devices or memories that may or may not operate in parallel.

Computing devices 110 may all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio-visual experiences. In this regard, internal electronic display 152 may be located within a cabin of vehicle 100 and may be used by computing devices 110 to provide information to passengers within the vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing devices 110 may be controlling computing devices of an autonomous driving computing system or incorporated into vehicle 100. The autonomous driving computing system may be capable of communicating with various components of the vehicle in order to control the movement of vehicle 100 according to the autonomous control software of memory 130 as discussed further below. For example, returning to FIG. 1, computing devices 110 may be in communication with various systems of vehicle 100, such as deceleration system 160, acceleration system 162, steering system 164, signaling system 166, routing system 168, planning system 170, positioning system 172, perception system 174, and power system 176 (i.e. the vehicle's engine or motor) in order to control the movement, speed, etc. of vehicle 100 in accordance with the instructions 134 of memory 130. Again, although these systems are shown as external to computing devices 110, in actuality, these systems may also be incorporated into computing devices 110, again as an autonomous driving computing system for controlling vehicle 100.

As an example, computing devices 110 may interact with one or more actuators of the deceleration system 160 and/or acceleration system 162, such as brakes, accelerator pedal, and/or the engine or motor of the vehicle, in order to control the speed of the vehicle. Similarly, one or more actuators of the steering system 164, such as a steering wheel, steering shaft, and/or pinion and rack in a rack and pinion system, may be used by computing devices 110 in order to control the direction of vehicle 100. For example, if vehicle 100 is configured for use on a road, such as a car or truck, the steering system may include one or more actuators to control the angle of wheels to turn the vehicle. Signaling system 166 may be used by computing devices 110 in order to signal the vehicle's intent to other drivers or vehicles, for example, by lighting turn signals or brake lights when needed.

Planning system 170 may be used by computing devices 110 in order to determine trajectories in order to enable the vehicle to follow a route generated by a routing system 168 to a destination. For instance, the routing system 168 may use map information to determine a route from a current location of the vehicle to a drop off location using known techniques. The planning system 170 may periodically generate trajectories, or short-term plans for controlling the vehicle for some period of time into the future or some distance, in order to follow the route (a current route of the vehicle) to the destination.

For example, detected objects, predicted future behaviors, various likelihoods from detection system software modules, the map information identifying the vehicle's environment, position information from the positioning system 170 identifying the location and orientation of the vehicle, a destination for the vehicle as well as feedback from various other systems of the vehicle may be input into a planning system software module of the planning system 170. The planning system may use this input to generate trajectories. A control system software module of the computing devices 110 may be configured to control movement of the vehicle, for instance by controlling braking, acceleration and steering of the vehicle, in order to follow a trajectory as discussed above.

In this regard, the planning system 170, routing system 168, and/or data 132 may store detailed map information, e.g., highly-detailed maps identifying the shape and elevation of roadways, lane lines, intersections, crosswalks, speed limits, traffic signals, buildings, signs, real time traffic information, vegetation, or other such objects and information. In addition, the map information may identify area types such as constructions zones, school zones, residential areas, parking lots, etc.

Figure 2:
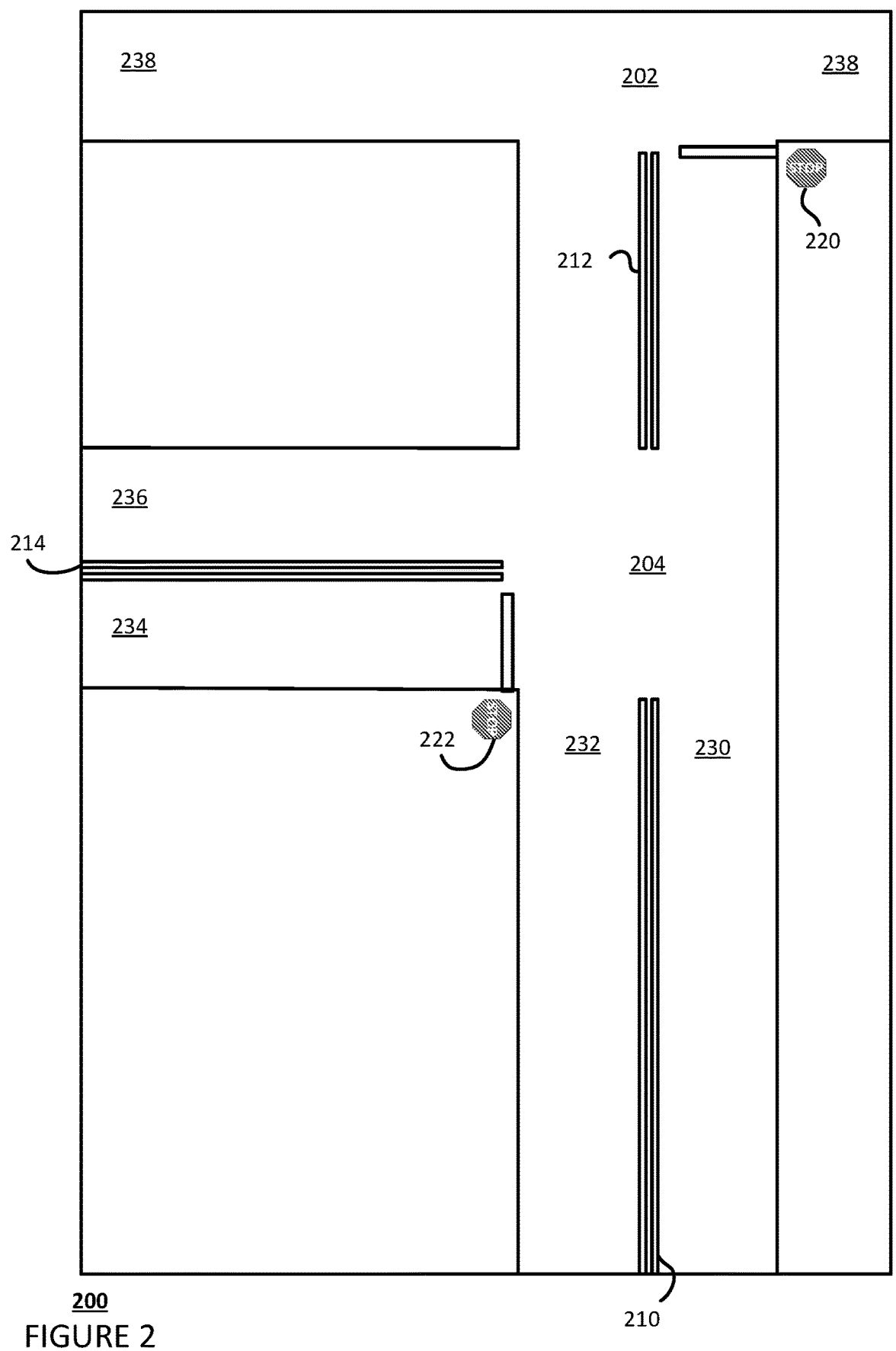
FIG. 2 is an example of map information in accordance with aspects of the disclosure.

FIG. 2 is an example of pre-stored map information 200 for a section of roadway including intersections 202, 204. In this example, the map information 200 includes information identifying the shape, location, and other characteristics of lane lines 210, 212, 214, stop signs 220, 222, lanes 230, 232, 234, 236, 238. Although the map information is depicted herein as an image-based map, the map information need not be entirely image based (for example, raster). For example, the map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Positioning system 170 may be used by computing devices 110 in order to determine the vehicle's relative or absolute position with respect to the pre-stored map information. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing devices 110, other computing devices and combinations of the foregoing.

Figure 3:
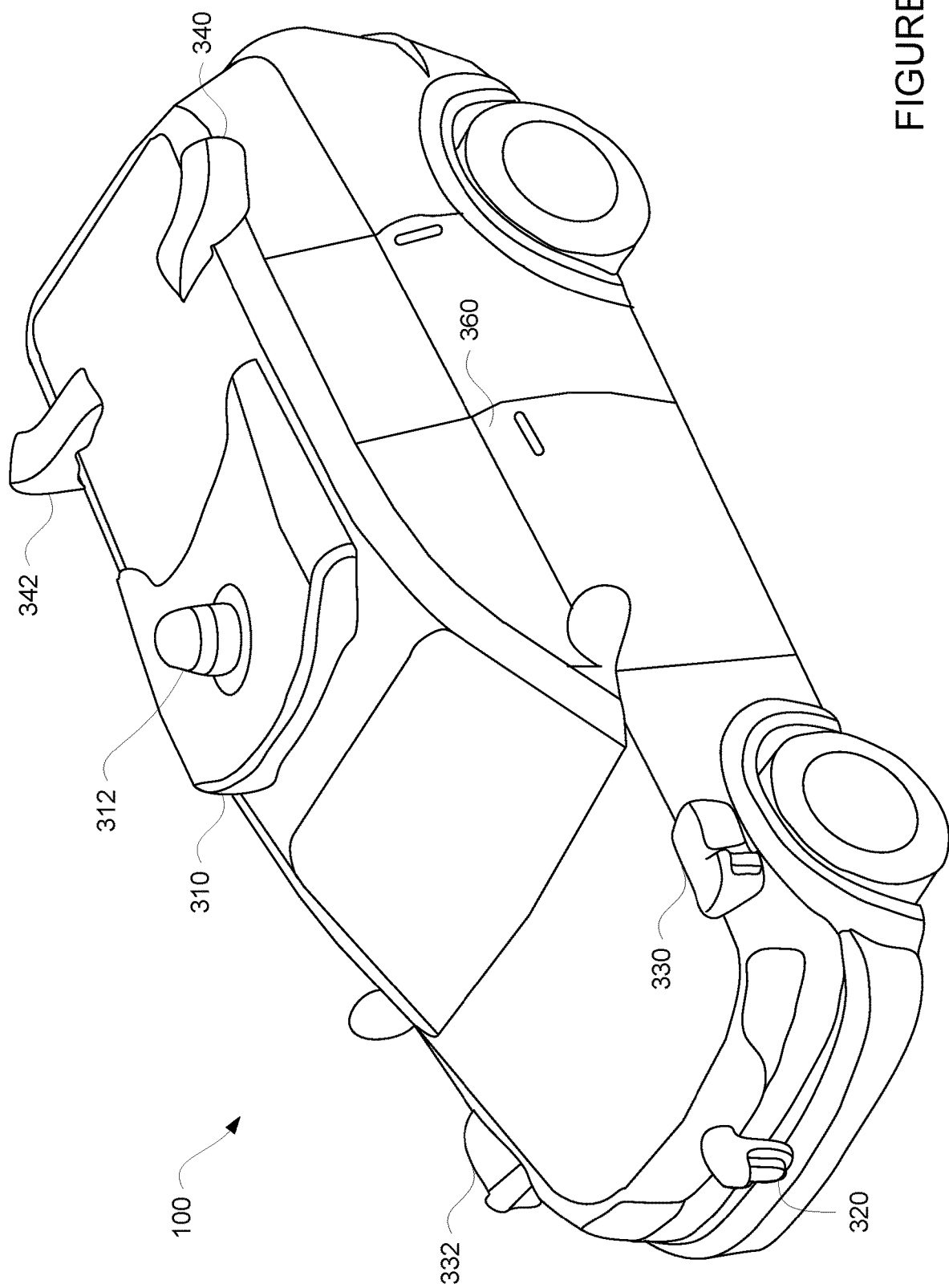
FIG. 3 is an example external view of a vehicle in accordance with aspects of the disclosure.

The perception system 174 also includes one or more components for detecting objects external to the vehicle such as other vehicles, obstacles in the roadway, traffic signals, signs, trees, etc. For example, the perception system 174 may include lasers, sonar, radar, cameras and/or any other detection devices that record data which may be processed by computing devices 110. In the case where the vehicle is a passenger vehicle such as a minivan, the minivan may include a laser or other sensors mounted on the roof or other convenient location. For instance, FIG. 3 is an example external view of vehicle 100. In this example, roof-top housing 310 and dome housing 312 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 360. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310.

The computing devices 110 may control the direction and speed of the vehicle by controlling various components. By way of example, computing devices 110 may navigate the vehicle to a destination location completely autonomously using data from the detailed map information and routing system 168. Computing devices 110 may use the positioning system 172 to determine the vehicle's location and perception system 174 to detect and respond to objects when needed to reach the location safely. In order to do so, computing devices 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 7:
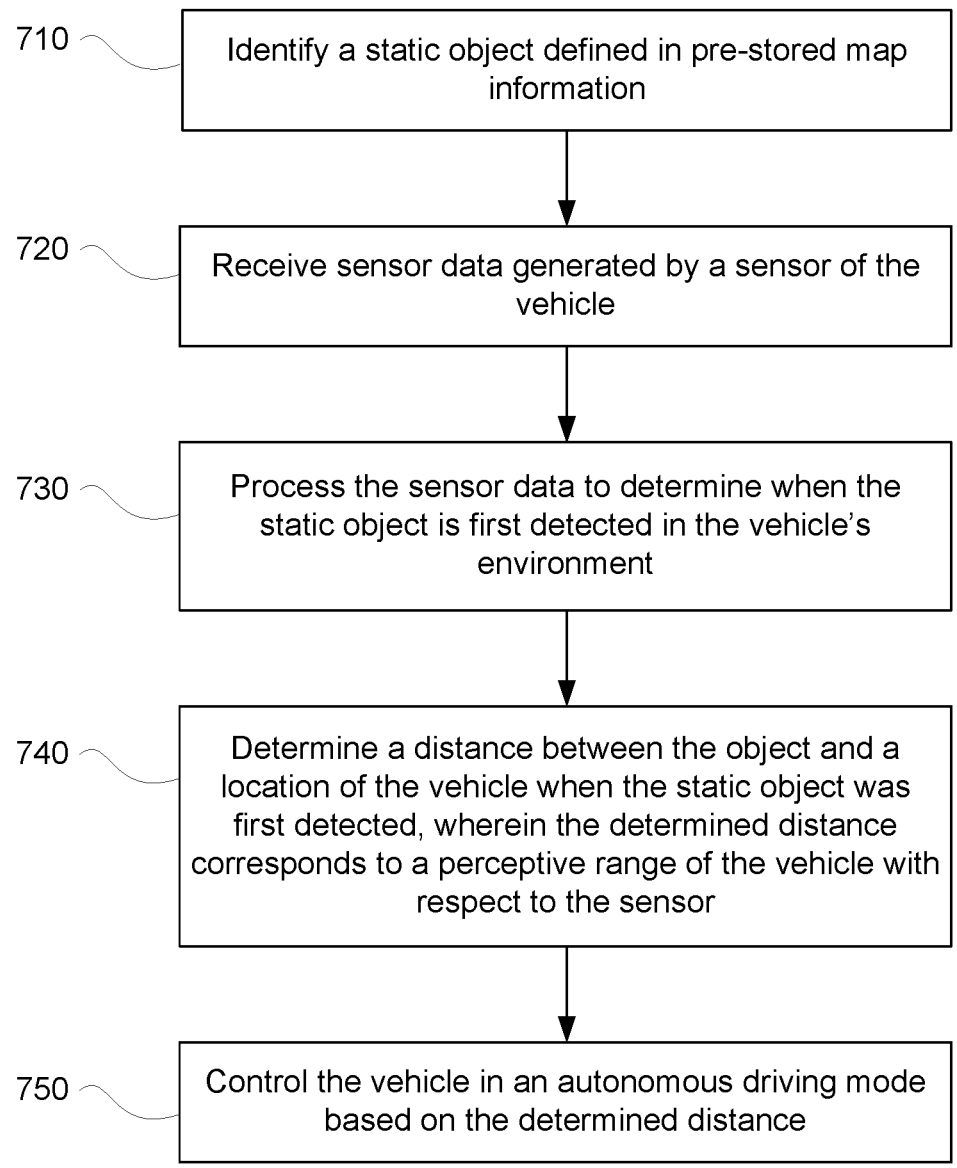
FIG. 7 is an example flow diagram in accordance with aspects of the disclosure.

FIG. 7 provides an example flow diagram 700 for determining the perceptive range of a sensor in real time. The steps of this flow diagram may be performed, for example, by one or more processors, such as the one or more processors 120 of computing devices 110 or some other processor or processors of the vehicle 100. Turning to block 710, a static object defined in pre-stored map information may be identified. For instance, as the vehicle follows a route towards a destination, the vehicle's computing devices may determine a plurality of trajectories, following one after the other to reach the destination as described above. Along the route and/or the trajectories, the vehicle's computing devices 110 may identify static objects from the map information that the vehicle may expect to approach, such as traffic lights, stop signs, speed limit signs, or other static objects for which the location is not likely to change.

Static objects may be particularly useful because their locations can be known in advance, that is, identified in pre-stored map information such as the map information 200 described above. In this regard, the static object may include traffic lights, stop signs, speed limit signs, or other objects that are precisely mapped. The known locations for these objects can be used as a ground truth for determining how far out the perception system can detect and classify a given object.

Figure 4:
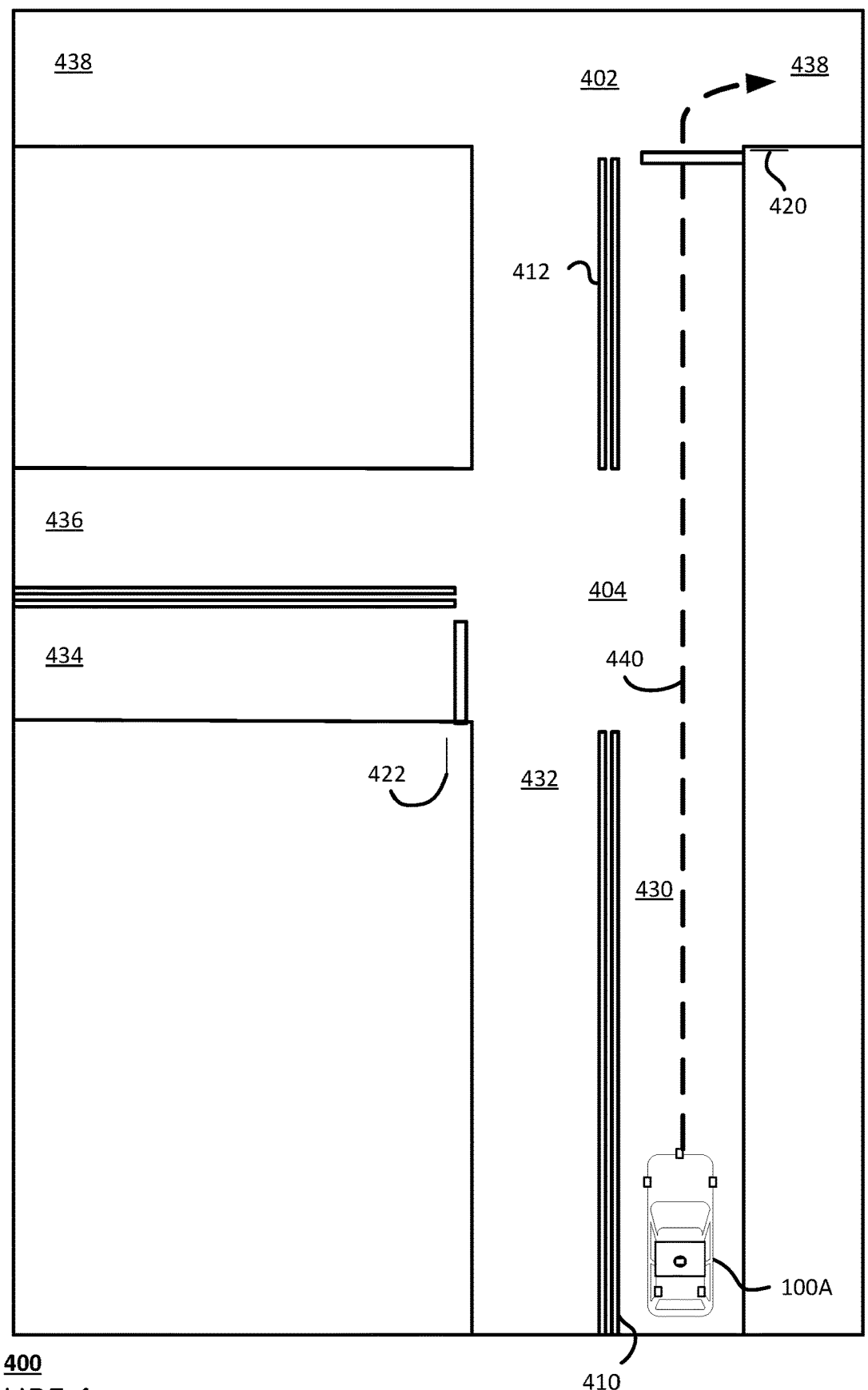
FIG. 4 is an example bird's eye view of a geographic area in accordance with aspects of the disclosure.

FIG. 4 corresponds to a bird's-eye view of a geographic area 400 corresponding to the map information 200. In this regard, the shape, location, and other characteristics of lane lines 410, 412, 414, stop signs 420, 422, lanes 430, 432, 434, 436, 438 correspond to the shape, location, and other characteristics of lane lines 210, 212, 214, stop signs 220, 222, lanes 230, 232, 234, 236, 238 of map information 200. Vehicle 100 is depicted in lane 430 approaching intersection 404 and stop sign 420.

In this example, vehicle 100 is following a trajectory 440 (corresponding to a portion of a route as described above) which may cause vehicle 100A to turn right at intersection 402. However, this trajectory and corresponding route will cause the vehicle 100 to approach, among other things, static objects such as the stop sign 220 (when trajectory 440 is considered in context with the map information 200 of FIG. 2). Thus, in this example, stop sign 220 may be identified as a static object for the trajectory 440.

Returning to FIG. 7, at block 720, sensor data generated by a sensor of the vehicle may be received. For instance, a camera of the perception system 174 may be used to capture images of objects. In this example, the camera may be a long-range, forward-facing camera that can be used to capture sensor data (e.g. camera images) and classify objects at farther distances than other sensors of the perception system. In other words, the perceptive range of a sensor may be limited by the distance at which the sensor data generated by the sensor can be used to identify objects accurately and reliably. In addition, this range can be affected by objects which occlude the sensor including weather conditions such as precipitation (rain, fog, snow, etc.) or debris (dust, leaves, etc.) which can be blowing around the vehicle due to wind conditions.

Figure 5:
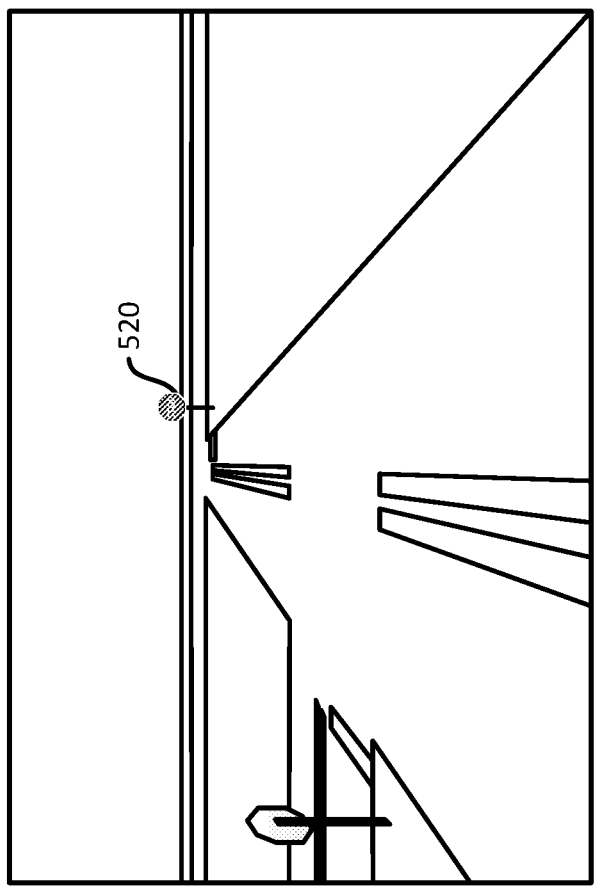
FIG. 5 is an example camera image in accordance with aspects of the disclosure.

In this regard, as the vehicle approaches the locations of static objects, the vehicle's computing devices may process sensor data from the perception system, such as camera images, in order to identify or classify these static objects. FIG. 5 is an example camera image 500 which may be captured by the aforementioned camera when the vehicle 100 is at the location in lane 430 (corresponding to lane 230) depicted in FIG. 4. In this example, stop sign 520 corresponds to stop sign 420.

Returning to FIG. 7, at block 730 the sensor data is processed to identify the static object. This may include determining when the static object is first detected in the vehicle's environment. For instance, information about the pose of the vehicle as well as the location of a traffic light or stop sign may be used to determine an expected distance when a traffic light or stop sign should appear in a camera image. This expected distance may be a predetermined distance, for example a distance that is at or slightly greater than an expected range of a camera at which a camera image from the camera would capture objects at a size (e.g. a number of pixels) large enough to detect and identify such objects, such as 260 meters or more or less. In this regard, when the vehicle is at least this predetermined distance from the static object, the computing devices may automatically begin processing images to identify the static object.

The sensor data may also be processed to identify the static object. For instance, for the camera image, identifying the static object may include various image processing techniques, such as those that use a sliding window approach, projecting the 3D location of the static object as defined in the map information into the camera image, or a combination of both. In many instances, when searching for traffic lights, the computing devices may not actually "identify" a traffic light in sensor data (e.g. a camera image) until the state of the traffic light (e.g. green, yellow, red, etc.) can or has also been identified via known image processing techniques.

The aforementioned processing may occur automatically as the vehicle maneuvers through the world in order to enable the vehicle's computing devices to make driving decisions as well as to assist in localization or other processing tasks. In this regard, since the vehicle's computing devices are already attempting to identify certain objects such as traffic lights and stop signs, the distance at which static objects are identified may be determined to be the perceptive range of the vehicle's perception system at that moment in time (including sensor performance and environmental effects). In other words, the perceptive range of a camera may be checked by determining how far from a mapped object that the object can be identified (e.g. recognized, analyzed, etc.).

Figure 6A:
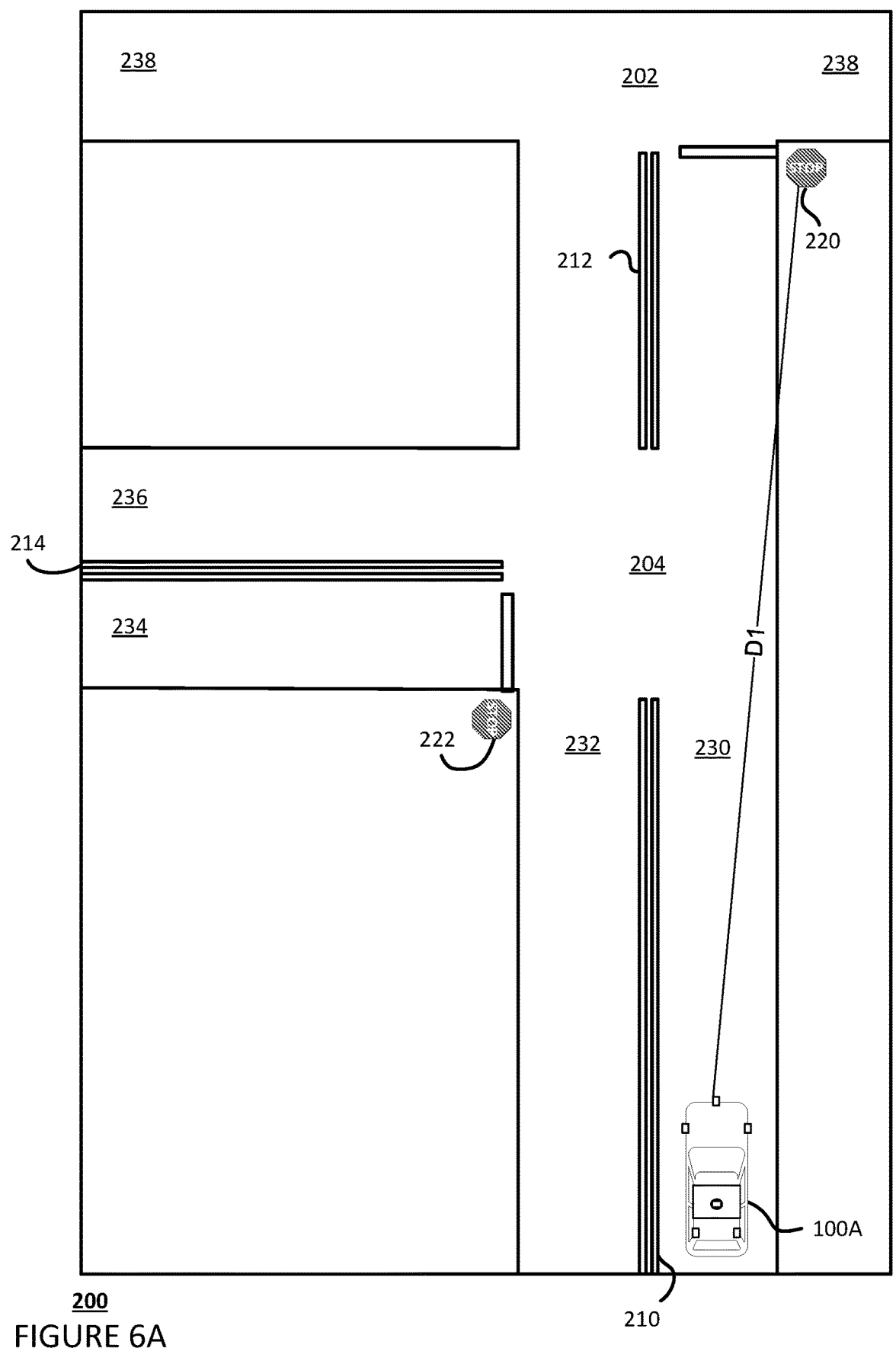
FIG. 6A is an example representation of a distance corresponding to a perceptive range in accordance with aspects of the disclosure.
Figure 6B:
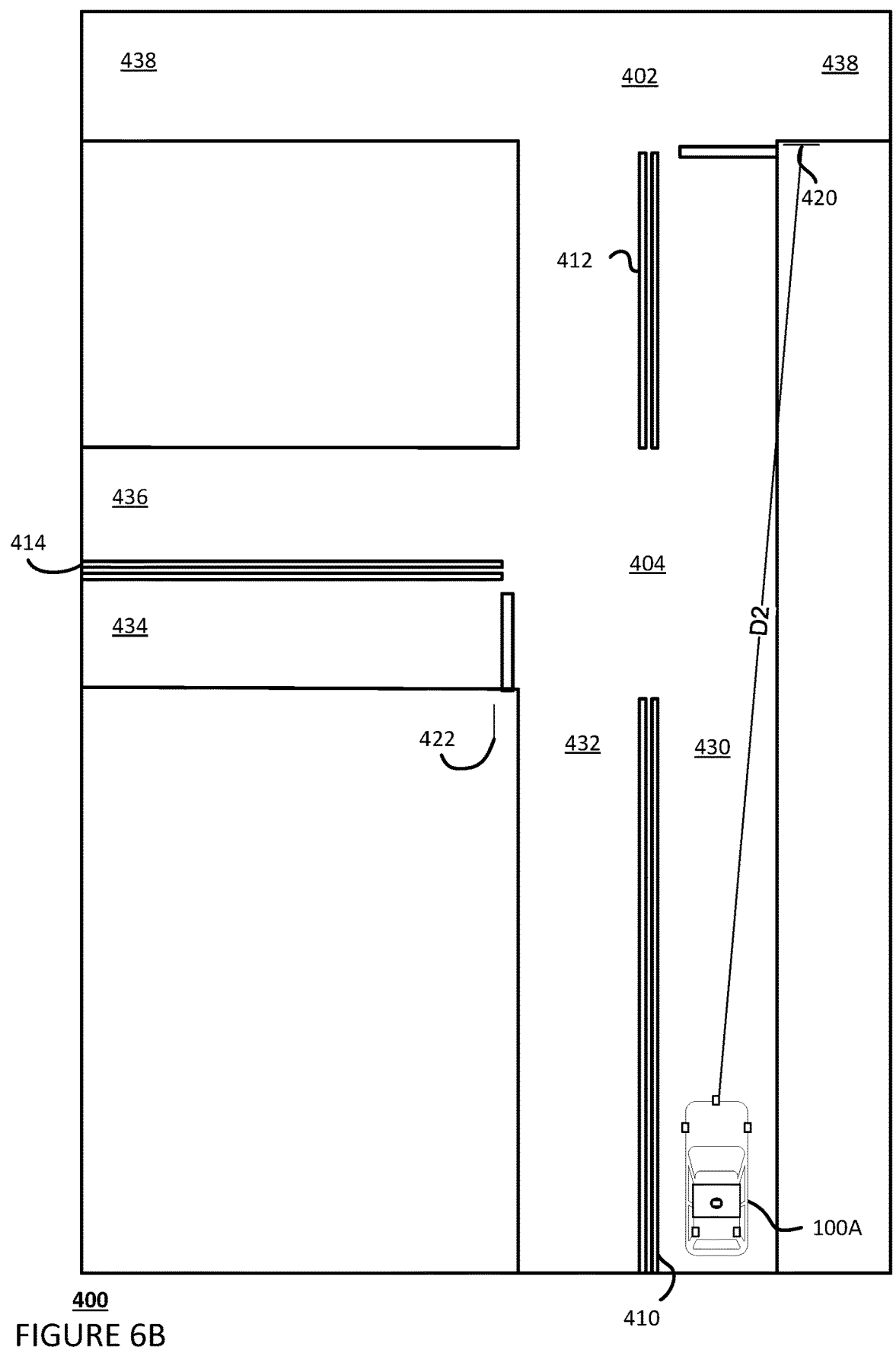
FIG. 6B is an example representation of a distance corresponding to a perceptive range in accordance with aspects of the disclosure.

Returning to FIG. 7, at block 740, a distance between the object and a location of the vehicle when the static object was first detected is determined. This distance may correspond to a perceptive range of the vehicle with respect to the sensor. For instance, turning to FIG. 6A, at the time the camera image 500 was captured, the distance between the vehicle 100 and the location of the stop sign 220 identified in the map information 200 is represented by the distance D1. D1 may correspond to the distance between a reference point on the vehicle, such as a location of the camera that captured the camera image 500, an axle of the vehicle, or some other location (e.g. a location that can be used as a default location for all sensors of the perception system), and the mapped location of the stop sign 220. In this regard, the distance D1 may be determined from the distance between the location of the vehicle at a time when the camera image 500 was captured and the mapped location of the static object. For example, if D1 is 200 meters, the perceptive range of the vehicle at the point in time when the camera image 500 was captured would be 200 meters. Alternatively, as shown in FIG. 6B, the distance may be determined from the distance between the location of the vehicle (or rather the reference point on the vehicle) at a time when the camera image was captured and an estimated location of the stop sign (e.g. the static object) determined from the camera image represented by the distance D2. The distance D2 may be determined by estimating a size or number of pixels of the stop sign 520 in the camera image and comparing to an expected size or number of pixels from the map information given the location of the vehicle when the camera image was captured. In addition or alternatively, the distance may be determined using an estimated location of the object determined using sensor data from other sensors of the perception system 174 (e.g. a second sensor different from the sensor used to capture the camera image).

Returning to FIG. 7, at block 750, the vehicle may be controlled in the autonomous driving mode based on the determined distance. This determined distance can be used in a number of ways. For instance, the determined distance may bound the planning system 170 of the vehicle. As an example, the determined distance can be used to derive how long in time or distance that the determined trajectories for the vehicle should be, or rather a maximum planning time or maximum planning distance. In this example, as the perceptive range decreases, the maximum planning time and/or maximum planning distance of the trajectories may also decrease. In some examples, the maximum planning time and/or maximum planning distance of a trajectory can also be speed dependent and related to perceptive ranges in a pre-set table of acceptable speeds for given perceptive ranges or based on vehicle dynamics and environmental conditions dependent modeling. Thus, understanding the perceptive range in real time can be especially useful for certain types of vehicles such as tractor-trailer trucks which require longer distance trajectories for useful operation. In addition or alternatively, as the perceptive range decreases, a maximum acceptable speed of the vehicle (which may correspond to a posted speed limit or some other value) may also be reduced. In addition or alternatively, the vehicle's computing devices may control the vehicle in order to avoid certain predetermined types of driving situations such as unprotected turns, highway or other high-speed driving areas, high-traffic or otherwise crowded areas, etc.

Although the examples described herein relate to a forward perceptive range, the features described herein are also useful for determining the perceptive range in 360 degrees or in whatever directions for which the perception system has sensors. In this regard, when used for a plurality of different cameras mounted in different orientations relative to the vehicle, the features described herein may provide a more holistic understanding of the vehicle's perception range at any given point in time. For instance, the computing devices 110 may track a measured and estimated sensor field of view in meters 360 degrees around the vehicle using the various techniques described above for different cameras or other sensors mounted at different locations on the vehicle and oriented in different directions relative to the vehicle. This measured and estimated sensor field of view may then be input into the planning system and various other systems of the vehicle in order to make driving decisions (e.g. plan future trajectories for the vehicle).

The features described herein may enable the real-time determination of a perceptive range of a vehicle's perception system using very little additional resources by leveraging processing that already occurs on the vehicle. As such, every time the vehicle approaches certain static, mapped objects such as traffic lights and stop signs, the perceptive range can be determined rather than simply periodically.

In addition, the determination of perceptive range can also be used as a proxy for estimating weather conditions which are or can affect the vehicle's perception system without requiring complicated weather detection models which require significant amounts of memory and processing power. In other words, rather than estimating weather conditions and guessing at how those conditions are affecting the perceptive range of the vehicle, the features described herein may enable the vehicle's computing devices to directly determine that perceptive range. In this regard, the vehicle's computing devices are able to much more easily recognize a change in perceptive range of the vehicle's sensors even earlier than if estimating weather and may even enable the vehicle's computing devices to perceive weather conditions before such the vehicle actually enters such conditions (e.g. before the vehicle drives into rain or fog). In addition, the features described herein may allow an autonomous vehicle's computing devices to estimate the weather conditions at a much smaller region, for example, on a block by block basis. Such information can then be shared across a fleet of vehicles in order to avoid those areas experiencing certain weather conditions (e.g. low visibility in a particular area, snow, fog, etc.) and/or change driving styles of those vehicles accordingly.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for determining perceptive range of a vehicle in real time, the method comprising:
   receiving, by one or more processors, sensor data generated by a sensor of the vehicle, the sensor having an expected range at which an image of a static object in an environment of the vehicle is captured by the sensor to detect the static object;
   determining, by the one or more processors, that the static object is located within the expected range of the sensor;
   based on the determining, processing, by the one or more processors, the sensor data to determine when the static object is first detected in the environment of the vehicle;
   identifying, by the one or more processors, a number of pixels in a camera image of the static object captured from the vehicle;
   determining, by the one or more processors, a distance between the static object and a location of the vehicle when the static object was first detected by comparing the identified number of pixels in the camera image of the static object to an expected number of pixels based on map information and the location of the vehicle when the camera image was captured; and
   controlling, by the one or more processors, the vehicle in an autonomous driving mode based on the determined distance.

2. The method of claim 1, wherein the sensor is a camera, and the sensor data includes a camera image.

3. The method of claim 2, wherein the sensor is a forward-facing camera.

4. The method of claim 1, wherein the static object is a traffic signal.

5. The method of claim 4, wherein when the static object is first detected includes when a state of the traffic signal was first determined.

6. The method of claim 1, wherein the static object is a stop sign.

7. The method of claim 1, wherein determining the distance is based on a location of the static object defined in pre-stored map information.

8. The method of claim 1, wherein determining the distance is based on a location of the static object determined from the sensor data.

9. The method of claim 1, wherein determining the distance is based on a location of the static object determined from second sensor data generated by a second sensor.

10. The method of claim 1, wherein controlling the vehicle includes using the determined distance as a bound upon a planning system of the vehicle, wherein the planning system is configured to generate trajectories for the vehicle to follow.

11. The method of claim 10, wherein the bound relates to a maximum planning distance for a trajectory of the vehicle.

12. The method of claim 10, wherein the bound relates to a maximum planning time for a trajectory of the vehicle.

13. The method of claim 1, wherein controlling the vehicle includes using the determined distance to determine a maximum speed value for the vehicle.

14. The method of claim 1, wherein controlling the vehicle includes avoiding one or more predetermined types of driving situations.

15. The method of claim 14, wherein the one or more predetermined types of driving situations includes highway driving.

16. A system for determining perceptive range of a vehicle in real time, the system comprising one or more processors configured to:
   receive sensor data generated by a sensor of the vehicle, the sensor having an expected range at which an image of a static object in an environment of the vehicle is captured by the sensor to detect the static object;
   determine that the static object is located within the expected range of the sensor;
   based on the determination, process the sensor data to determine when the static object is first detected in the environment of the vehicle;
   identify a number of pixels in a camera image of the static object captured from the vehicle;
   determine a distance between the static object and a location of the vehicle when the static object was first detected by comparing the identified number of pixels in the camera image of the static object to an expected number of pixels based on map information and the location of the vehicle when the camera image was captured; and
   control the vehicle in an autonomous driving mode based on the determined distance.

17. The system of claim 16, wherein the sensor is a camera, and the sensor data includes a camera image.

18. The system of claim 16, wherein the static object is a traffic signal.

19. The system of claim 16, wherein the static object is a stop sign.

20. The system of claim 16, further comprising the vehicle.

* * * * *